US009987719B2

(12) United States Patent
Ronshaugen et al.

(10) Patent No.: US 9,987,719 B2
(45) Date of Patent: Jun. 5, 2018

(54) METHOD AND ASSEMBLY FOR GRINDING AND/OR CUTTING A SLIDER BAR ON A LAPPING CARRIER

(71) Applicant: Seagate Technology LLC, Cupertino, CA (US)

(72) Inventors: Marc Ronshaugen, Eden Prairie, MN (US); Joel Hoehn, Hudson, WI (US); Gordon Jones, Fairbault, MN (US); Yuhong Xiong, Maple Grove, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 185 days.

(21) Appl. No.: 14/323,101

(22) Filed: Jul. 3, 2014

(65) Prior Publication Data

US 2015/0017883 A1    Jan. 15, 2015

Related U.S. Application Data

(60) Provisional application No. 61/844,612, filed on Jul. 10, 2013.

(51) Int. Cl.
*B24B 37/04* (2012.01)
*B24B 37/30* (2012.01)
*B24B 37/34* (2012.01)
*G11B 5/31* (2006.01)

(52) U.S. Cl.
CPC ............ *B24B 37/048* (2013.01); *B24B 37/30* (2013.01); *B24B 37/34* (2013.01); *G11B 5/3169* (2013.01); *G11B 5/3173* (2013.01); *Y10T 83/7487* (2015.04)

(58) Field of Classification Search
CPC ....... B24B 37/048; B24B 37/30; B24B 37/34; G11B 5/3169; G11B 5/3173; Y10T 83/7487
See application file for complete search history.

(56) References Cited

U.S. PATENT DOCUMENTS

| | | | | |
|---|---|---|---|---|
| 5,468,177 | A * | 11/1995 | Kindler | B24B 37/30 269/289 R |
| 5,749,769 | A * | 5/1998 | Church | B24B 19/26 29/603.12 |
| 6,050,878 | A * | 4/2000 | Kanzo | B24B 37/048 451/1 |
| 6,332,264 | B1 * | 12/2001 | Itoh | G11B 5/1272 29/423 |
| 6,346,029 | B1 | 2/2002 | Church et al. | |
| 6,551,438 | B1 * | 4/2003 | Tanemura | G11B 5/3103 156/155 |

(Continued)

*Primary Examiner* — Christopher M Koehler
*Assistant Examiner* — Joel Crandall
(74) *Attorney, Agent, or Firm* — Westman, Champlin & Koehler, P.A.

(57) ABSTRACT

One or more slider bars are attached to at least one component of a multi-component carrier device. The multi-component carrier device is attached to a lapping arm of a lapping machine and the one or more slider bars attached to the carrier device are lapped. The at least one component of the multi-component carrier device is attached to a grinding/cutting machine. At least one of a grinding operation or a cutting operation is performed on the one or more slider bars.

12 Claims, 15 Drawing Sheets

(56) References Cited

U.S. PATENT DOCUMENTS

| | | | | |
|---|---|---|---|---|
| 6,687,976 B1* | 2/2004 | Koyama | ............... | G11B 5/3173 216/22 |
| 2002/0052172 A1* | 5/2002 | Nishioka | ................. | B24B 37/00 451/41 |
| 2006/0292968 A1* | 12/2006 | Fujii | ....................... | B24B 27/06 451/54 |
| 2009/0229112 A1* | 9/2009 | Hamakawa | ............ | G11B 5/102 29/603.09 |

* cited by examiner

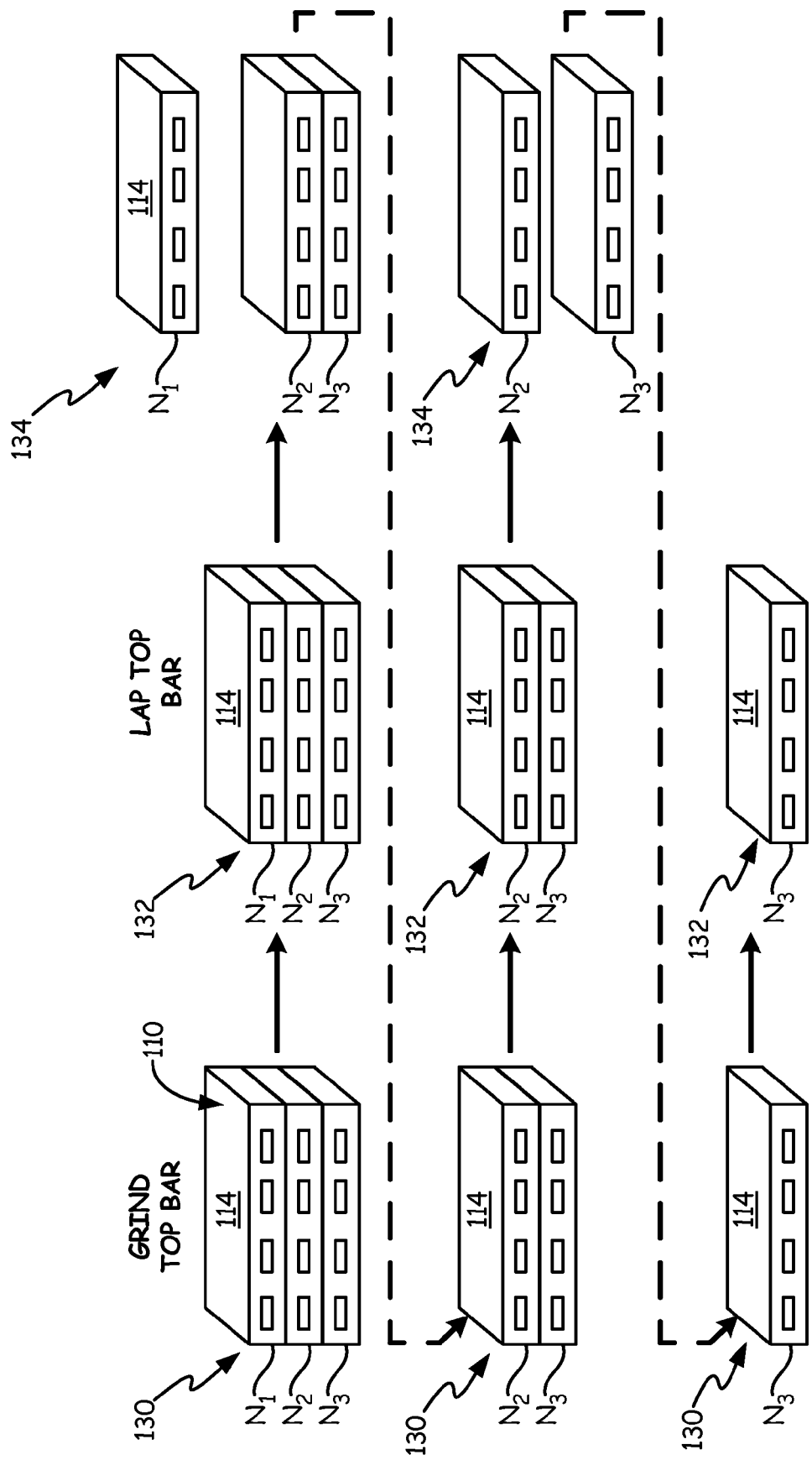

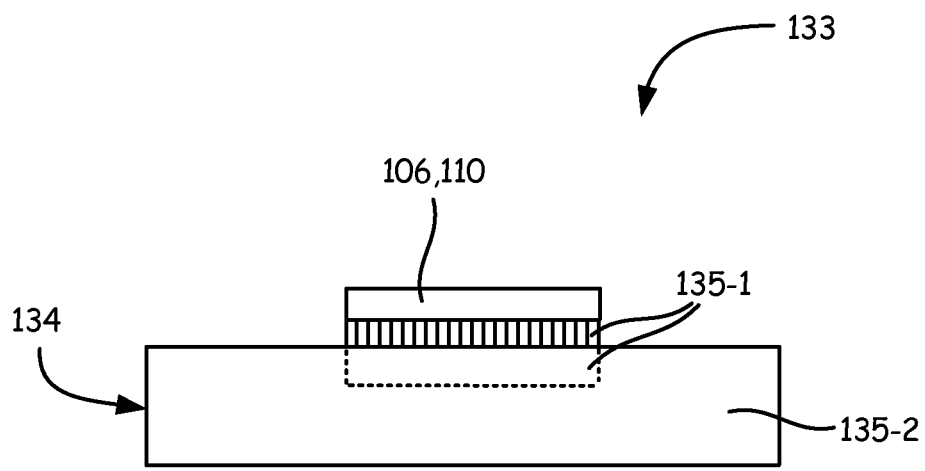
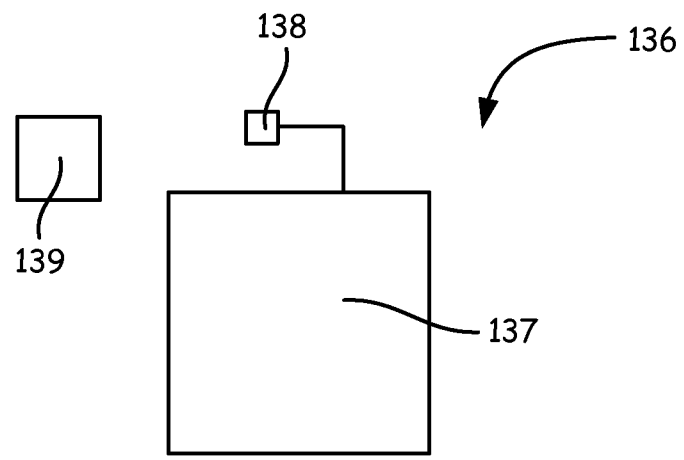
FIG. 3

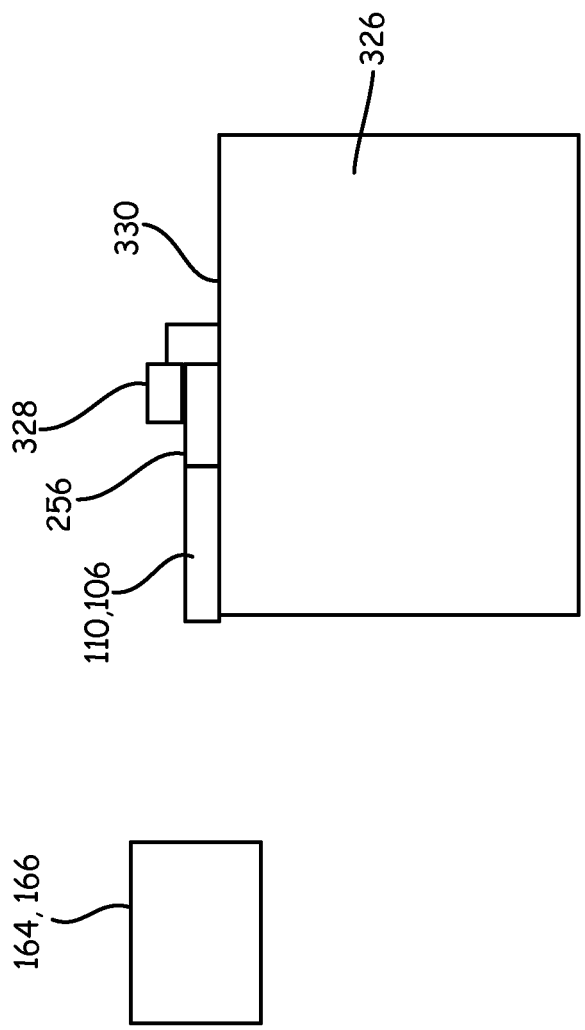

METHOD AND ASSEMBLY FOR GRINDING AND/OR CUTTING A SLIDER BAR ON A LAPPING CARRIER

CROSS-REFERENCE TO RELATED APPLICATIONS

The present application is based on and claims the benefit of U.S. provisional patent application Ser. No. 61/844,612, filed Jul. 10, 2013, the content of which is hereby incorporated by reference in its entirety.

BACKGROUND

Data storage systems commonly have a recording head that includes a read transducer that reads information from a data storage medium and a write transducer that writes information to a data storage medium. Usually, the recording head is integrally mounted in a carrier or support referred to as a "slider." In manufacturing such recording heads, a large number of sliders are fabricated from a single wafer having rows of heads deposited on the wafer surface using semiconductor-type process methods. In one process embodiment, after the deposition of the heads is complete, cutting, grinding and lapping operations are carried out to produce individual sliders from the wafer.

SUMMARY

The present disclosure relates to methods and assemblies for grinding and/or cutting a slider bar on a lapping carrier.

In one method embodiment, one or more slider bars are attached to at least one component of a multi-component carrier device. The multi-component carrier device is attached to a lapping arm of a lapping machine and the one or more slider bars attached to the carrier device are lapped. The at least one component of the multi-component carrier device is attached to a grinding/cutting machine. At least one of a grinding operation or a cutting operation is performed on the one or more slider bars.

In one carrier device embodiment, a multi-component structure is configured to secure one or more slider bars to a lapping machine. At least one component of the multi-component structure is further configured to secure the one or more slider bars to a grinding/cutting machine.

In one assembly embodiment, a multi-component carrier device is configured to secure one or more slider bars to a lapping machine. A grinding/cutting machine is configured to perform at least one of grinding operations or cutting operations on the one or more slider bars. The grinding/cutting machine includes a stage and a clamping mechanism. The clamping mechanism is configured to clamp at least one component of the multi-component carrier device to the stage to enable the grinding/cutting machine to carry out the at least one of the grinding operations or the cutting operations on the one or more slider bars.

These and other features and aspects of various embodiments may be understood in view of the following detailed discussion and accompanying drawings.

BRIEF DESCRIPTION OF THE DRAWINGS

FIGS. 2A-2B illustrate different process sequences for cutting, grinding and lapping slider bars cut from the wafer.

FIG. 3 illustrates an assembly that includes a lapping carrier that can be attached to a grinding/cutting machine.

FIG. 10 schematically illustrates an embodiment of a grinding/cutting apparatus that is capable of securing a modular extender of the modular carrier shown in FIGS. 9A-9E.

DETAILED DESCRIPTION OF ILLUSTRATIVE EMBODIMENTS

Figure 1:
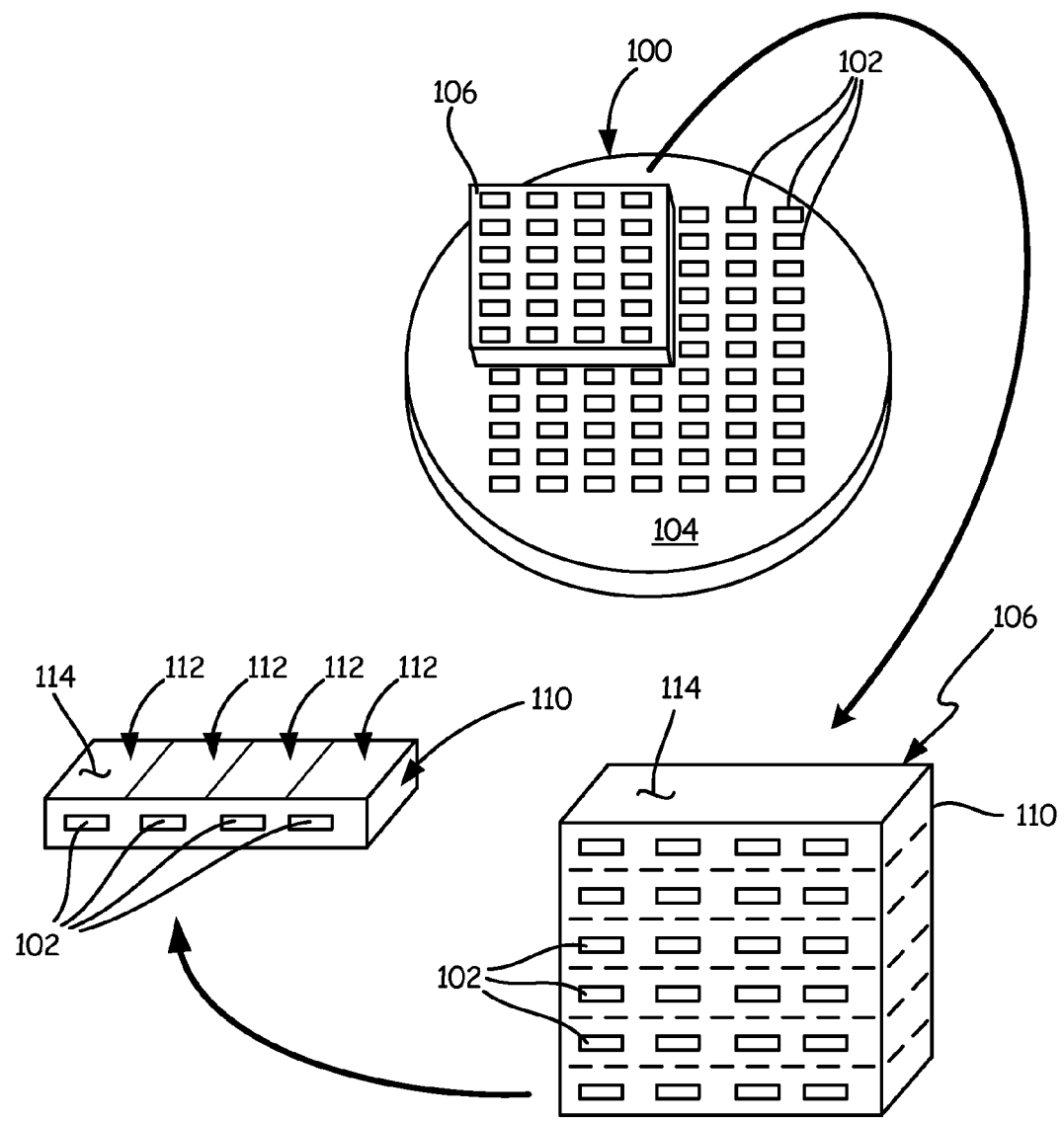
FIG. 1 illustrates wafer fabrication of head components where a wafer is cut into slider bar stacks or chunks and then cut into individual slider bars to form the heads.

Grinding/cutting processes and machines are used in combination with lapping processes to fabricate heads or other components, which require tight tolerance control. FIG. 1 illustrates a wafer 100 for fabricating multiple heads or sliders for data storage devices. As shown, an array of transducer elements 102 is deposited or formed on a front surface 104 of the wafer 100 using known thin film deposition techniques. Following deposition of the transducer elements 102, the wafer 100 is cut into slider bar stacks or chunks 106 including multiple slider bars 110. In some applications, the slider bar stack or chunk 106 includes 48 slider bars 110 and in other applications a 9 bar chunk is cut. Application of the embodiments described herein is not limited to a slider bar stack or chunk 106 having a particular number of slider bars 110. Bars 110 are cut from the stack 106 to form a row of sliders or heads 112. As shown in FIG. 1, each of the slider bars 110 of the stack 106 has a front surface 114 which forms a bearing surface (for example, an air bearing surface) of the slider or head 112. The front or bearing surface 114 of the bar 110 is ground and/or lapped during the fabrication process to enhance flatness and perpendicular alignment of the bearing surfaces of the sliders 112.

Figure 2A:
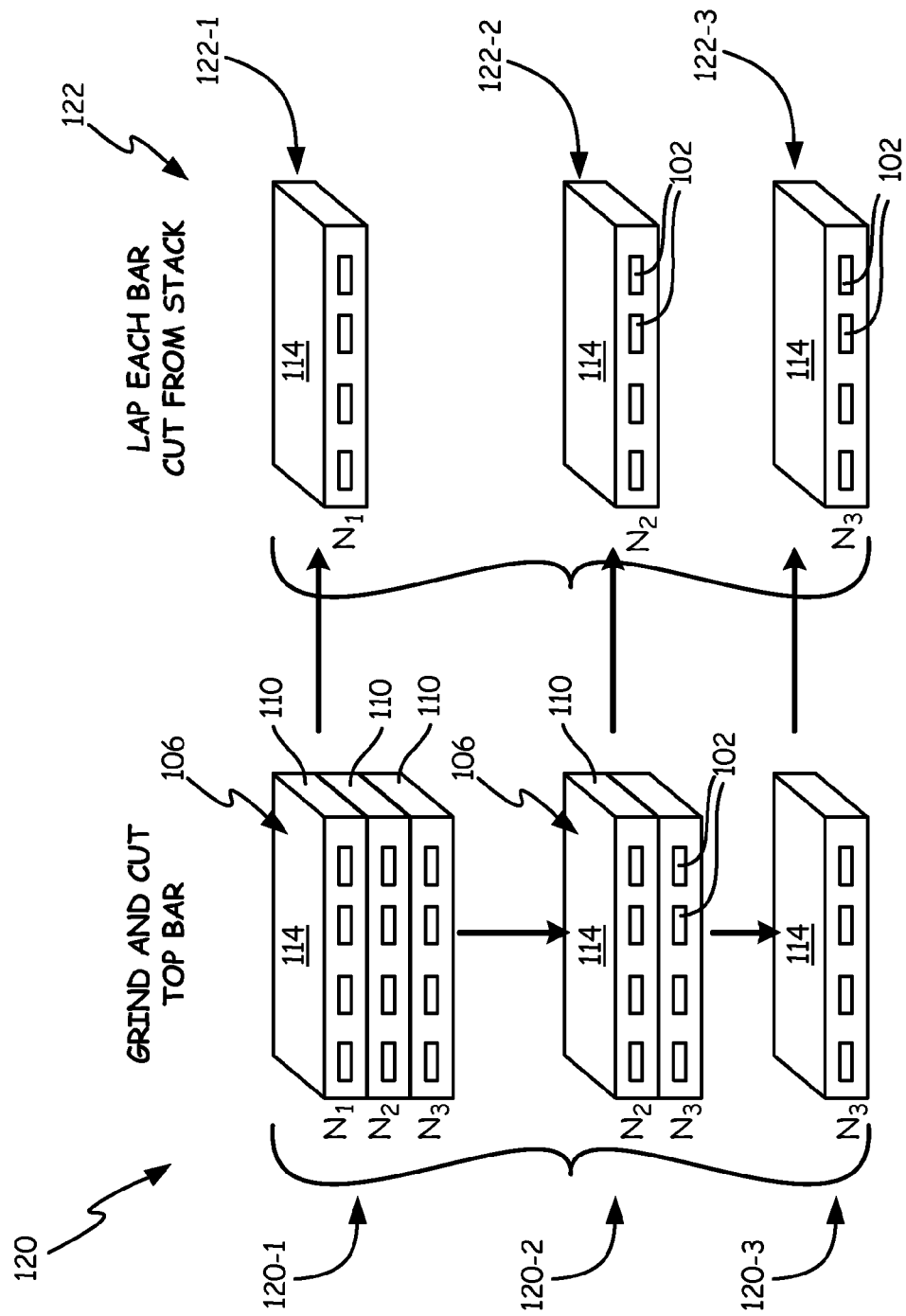

FIGS. 2A-2B illustrate embodiments of different process sequences for grinding, cutting and lapping slider bars 110 from a slider bar stack or chunk 106. In the process sequence illustrated in FIG. 2A, the slider bar stack 106 is ground and bars 110 are cut from the stack 106 in a first process step 120 and lapped in a second process step 122. In the illustrated embodiment, the slider bar stack 106 includes bars $N_1$-$N_3$. In process step 120, the top surface of each of the slider bars $N_1$-$N_3$ is ground and each of the slider bars $N_1$-$N_3$ is sequentially cut from the stack 106. In particular, as shown, in sub-step 120-1, the top surface 114 of bar $N_1$ is ground and then bar $N_1$ is cut from the stack 106. In sub-step 120-2, the top surface 114 of bar $N_2$ is ground and bar $N_2$ is cut from the stack 106. In sub-step 120-3, the final bar $N_3$ is ground. Following process steps 120-1, 120-2, 120-3, each of the slider bars $N_1$-$N_3$ is lapped in process steps 122-1, 122-2, 122-3 to provide a desired surface profile, flatness, perpendicularism, etc.

FIG. 2B illustrates an alternate process sequence for grinding and lapping bars in a bar stack 106 including bars $N_1$-$N_3$. In the embodiment illustrated in FIG. 2B, the top bar $N_1$ of the stack 106 is sequentially ground in step 130, lapped in step 132 and cut from the stack in step 134. In particular, the surface 114 of top bar $N_1$ is ground in step 130 and lapped in step 132. Following the grinding and lapping in steps 130, 132, the top bar $N_1$ is cut from the stack 110 so that bar $N_2$ becomes the top bar. The process of grinding-lapping-cutting of steps 130, 132, 134 is then repeated for top bar $N_2$ so that, following step 134, bar $N_3$ is the top bar. The process steps of grinding and lapping 130, 132 the top surface 114 is repeated for top bar $N_3$. The process sequence illustrated in steps 130, 132 and 134 is repeated until each bar 110 in the stack 106 is ground and lapped and then separated from the stack 106.

During the lapping and grinding processes, the bar 110 is subjected to forces which can introduce strain and/or distortion to the bar reducing tolerance control of the fabrication process. In the process sequence illustrated in FIG. 2B, bars 110 are lapped in the bar stack 106, which increases the rigidity of the workpiece reducing the stress in the bar and increasing yield of heads that meet desired tolerance requirements. Although the process sequence illustrated in FIG. 2B increases yield, it also increases process steps and complexity. In particular, in the process sequence illustrated in FIG. 2A, once the bar 110 is set in a grinding/cutting machine, each of the bars 110 of the stack 106 is ground and cut. In contrast, in the process or sequence illustrated in FIG. 2B, the bar stack 106 needs to be reset after each grinding and lapping steps which increase fabrication cost and time.

Embodiments described below provide a carrier for a slider bar 110/stack 106 that can secure the bar 110/stack 106 to both a lapping machine and a grinding/cutting machine, thereby eliminating a need for resetting the stack 106 after each grinding and lapping step.

FIG. 3 illustrates an assembly 133 that includes a lapping carrier for a slider bar 110/stack 106 that can be attached to a grinding/cutting machine. As shown, the bar 110 or stack 106 is coupled to a carrier 134, which includes multiple components such as 135-1 and 135-2. Bar 110 or stack 106 may be bonded to carrier 134 using any suitable adhesive. In FIG. 3, the bar 110 or stack 106 is shown coupled to component 135-1. In some embodiments, components 135-1 and 135-2 are integrally formed into a single unit or non-releasably attached to each other. In other embodiments, component 135-1 is releasably coupled to component 135-2. It should be noted that carrier 134 is shown as including only two primary components (135-1 and 135-2) in the interest of simplification. In different embodiments, carrier 134 can include any suitable number of components. Carrier 134 is configured to couple to an arm of a lapping machine (not shown in FIG. 3 in the interest of simplification).

Also shown in FIG. 3 is a grinding/cutting apparatus 136 for carrying out grinding/cutting operations on slider bar 110/stack 106 when slider bar 110/stack 106 is coupled to at least one component of carrier 134. Primary components of grinding/cutting apparatus 136 include a stage 137, a clamping mechanism 138 and grinding/cutting tools 139. In one embodiment, the entire carrier 134 with the attached bar 110 or stack 106 is set on stage 137 and clamped using mechanism 138 to enable grinding/cutting operations to be carried out by tools 139. In another embodiment, to carry out a grinding/cutting step, component 135-1 with the attached bar 110 or stack 106 is detached from component 135-2. Then, component 135-1 with the attached bar 110 or stack 106 is set on stage 137 and clamped using mechanism 138 while grinding/cutting operations are carried out by tools 139 on bar 110 or stack 106. An embodiment in which an entire lapping carrier is attached to a grinding/cutting machine during a grinding/cutting process is described in connection with FIGS. 4A-4B, 5A-5C, 6A-6C, 7A-7B and 8. Thereafter, an embodiment in which only a component such as 135-1 of a carrier is attached to a grinding/cutting machine during a grinding/cutting process is described in connection with FIGS. 9A-9D and 10.

Figure 4A:
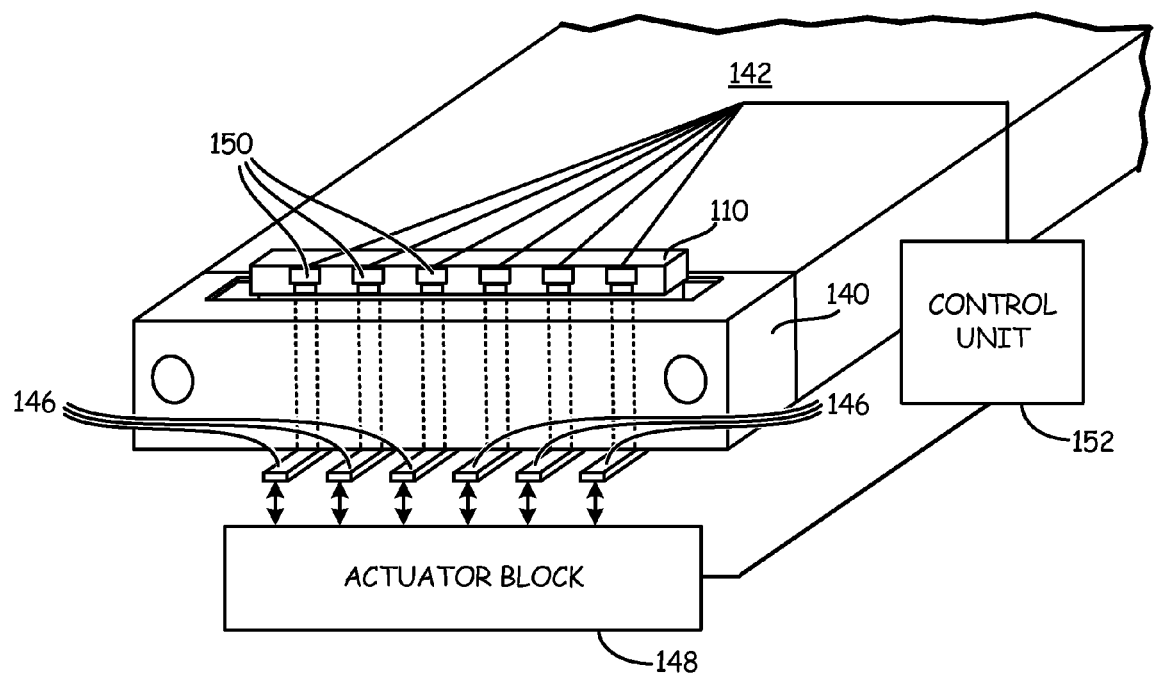
FIGS. 4A-4B illustrate a lapping assembly including a carrier having bending fingers for supplying bending inputs to a bar for lapping.
Figure 4B:
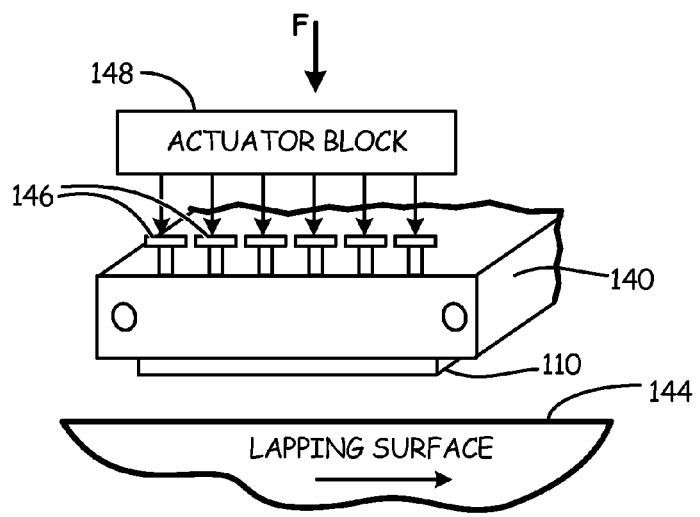

FIGS. 4A-4B schematically illustrate a lapping assembly for a slider bar 110/stack 106. As shown, the bar 110 or stack 106 is coupled to a carrier 140 which connects to a lapping arm 142. The lapping arm 142 supports the bar 110 above an abrasive lapping surface 144 as shown in FIG. 4B. Typically, the abrasive lapping surface 144 is formed on a rotating platen and the arm 142 is pivotally supported relative to a frame structure to move the arm 142 relative to the abrasive lapping surface 144 and bias the arm 142 towards the abrasive lapping surface 144 for material removal. The carrier 140, as shown, includes a plurality of bending fingers 146 configured to input various bending forces to the bar 110 during the lapping process to control twist, crown and camber dimensions of the bar 110.

As shown, input bending forces are applied to the fingers 146 through multiple actuator elements (not shown in FIGS. 4A-4B) of actuator block 148. The actuator elements are configured to impart a separate push/pull force to each of the fingers 146 which is transmitted through the fingers 146 on the carrier 140 to the bar 110 connected to the carrier 140 for lapping. As schematically shown, the bending profile of the bar 110 is controlled using feedback from electronic lapping guides (ELG) 150 on the bar 110 which serve as a proxy for reader or writer features. The electronic lapping guides 150 are fabricated at the wafer level on the front surface 104 of the wafer 100. Feedback from the electronic lapping guides 150 is used to operate or control the actuator elements of actuator block 148 to provide optimum bending input through control unit 152. The feedback is used to control the lapping process to provide the desired tolerance dimensions for the bar 110 and sliders 112. An alternative method of providing feedback and controlling the process would be to directly monitor the resistance of multiple read elements in the bar. An additional alternative would be to use optical or mechanical tracking for the feedback and control.

As previously described, in the process sequence illustrated in FIG. 2B, following the lapping step, bar $N_1$ is cut from the stack 106 in step 134 and the next bar $N_2$ is ground in step 130. Thereafter, the next bar $N_2$ is lapped in step 132. As previously described, the grinding/cutting and lapping steps are formed on different apparatus and thus the bar 110/stack 106 has to be removed, cleaned and reset for each lapping sequence following the grinding/cutting step 130. The process of setting the bar 110 or stack 106 in the lapping carrier 140 is time consuming. For lapping, wires are connected to the ELG 150 on the bar 110 inset into the carrier 140 and to control circuitry for feedback control. The present application relates to a grinding/cutting apparatus 160 and method adapted to grind and cut bars 110 of a bar stack 106 attached to the lapping carrier 140 as a carrier/bar or carrier/stack unit 162. Embodiments of the grinding/cutting apparatus 160 for the carrier/bar unit 162 are illustrated in FIGS. 5A-5C, 6A-6C and 7A-7B.

Figure 5A:
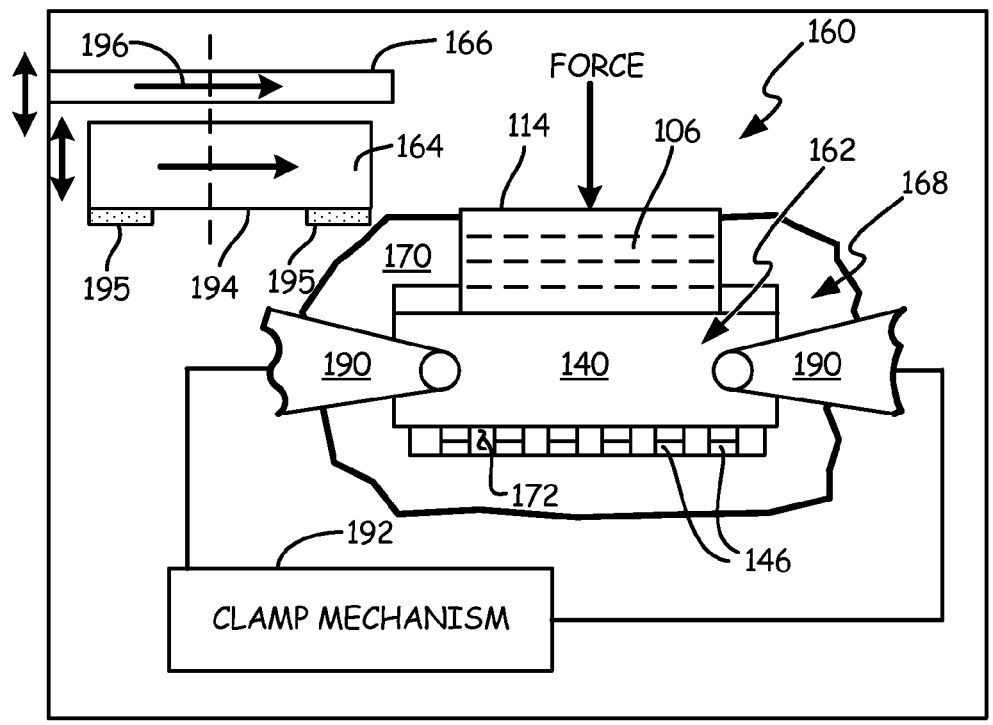
FIGS. 5A-5B schematically illustrate an embodiment of a grinding/cutting apparatus including a carrier nest with a back end wall for grinding/cutting a bar on a lapping carrier.
Figure 5B:
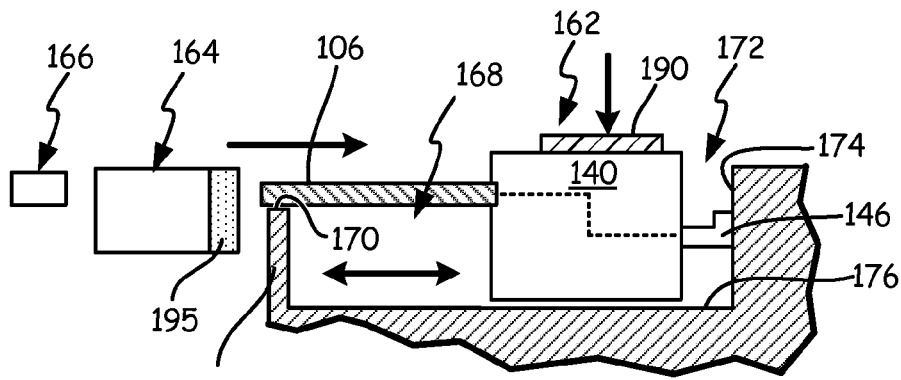

In the embodiment shown in FIG. 5A-5B, the apparatus 160 includes a grinding wheel 164 and blade 166 to grind and cut the slider bar 110 of the carrier/bar unit 162. As shown, the carrier/bar unit 162 is set on stage 168 for grinding/cutting. The stage 168 includes an upper surface 170 and carrier nest 172 recessed below the upper surface 170. The carrier nest 172 is sized to hold the carrier 140 so that the bar stack 106 is substantially aligned with the upper surface 170 of the stage 168. Portion 175 of stage 168 provides support for bar 110/stack 106 for cutting/grinding. The carrier nest 172 includes a back end wall 174 that extends from a lower surface 176 of the nest 172 toward the upper surface of the stage 168. In the embodiment shown in FIGS. 5A-5B, the nest 172 also includes a closed front end and sides however the application is not limited to the particular nest structure shown. For operation, the carrier 140 of the carrier/bar unit 162 is clamped to the stage 168 through clamps 190 operated via clamp mechanism 192 (shown schematically). Illustratively, the clamp mechanism 192 is a pneumatic clamping mechanism, which actuates the clamps 190 between the clamped position for grinding and cutting and an opened position for loading and unloading the carrier/bar unit 162. The clamps 190 are also opened to allow for movement of the carrier/bar unit 162 along lower surface 176 in the direction(s) shown in FIG. 5B for proper positioning of the stack 106 on portion 175 for cutting. When the stack 106 is properly positioned over portion 175, the clamps 190 are closed.

Figure 5C:
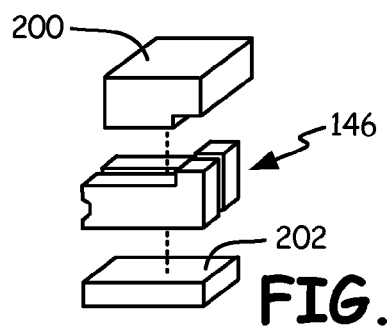
FIG. 5C illustrates a retaining block for limiting movement or displacement of the bending fingers on the carrier during the grinding/cutting process steps.

During the grinding operation, the grinding wheel 164 moves along the top surface 114 of the bar stack 106 as illustrated by arrow 194. As the grinding wheel 164 moves along the top surface 114 of the bar 110, an abrasive surface 195 of the wheel 164 contacts the top surface 114 for material removal. Similarly, the blade 166 moves along the bar stack 106 to cut or separate the top bar 110 from the stack 106 as illustrated by arrow 196. As shown, the grinding wheel 164 and blade 166 are longitudinally adjustable to position the grinding wheel 164 and cutting blade 166 relative to the workpiece to grind and cut the workpiece. In an alternate or additional embodiment, the stage 168 is adjustable relative to the grinding wheel 164 and cutting blade 166 to align the workpiece relative to the grinding wheel 164 and blade 166. During the grinding and cutting operations, force is imparted to the bar stack 106 via contact with the grinding wheel 164 and blade 166. In the illustrated embodiment, the back end wall 174 of the nest 172 is located to abut against the bending fingers 146 when the carrier 140 is clamped into the nest 172. Thus, the end wall 174 reduces displacement and extension of the fingers 146 as a result of the grinding force applied to the bar stack 106 and imparted to the fingers 146 through the carrier 140 as schematically illustrated by the dashed line in FIG. 5B. As schematically illustrated in FIG. 5C, prior to setting the carrier 140 in the nest 172, the fingers 146 can be placed between retaining blocks 200, 202 which are connected or secured to restrict lateral bending or displacement of the fingers 146 during the grinding and cutting process.

Figure 6A:
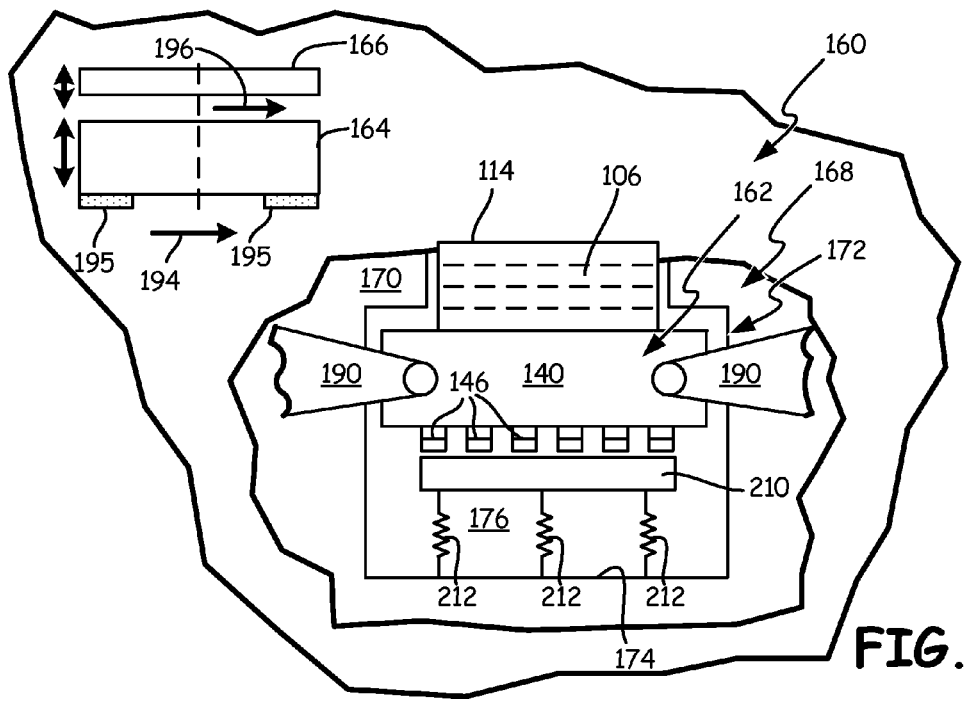
FIGS. 6A-6B schematically illustrate an embodiment of a grinding/cutting apparatus including a carrier nest and contact block for limiting movement or displacement of the bending fingers on the carrier.
Figure 6B:
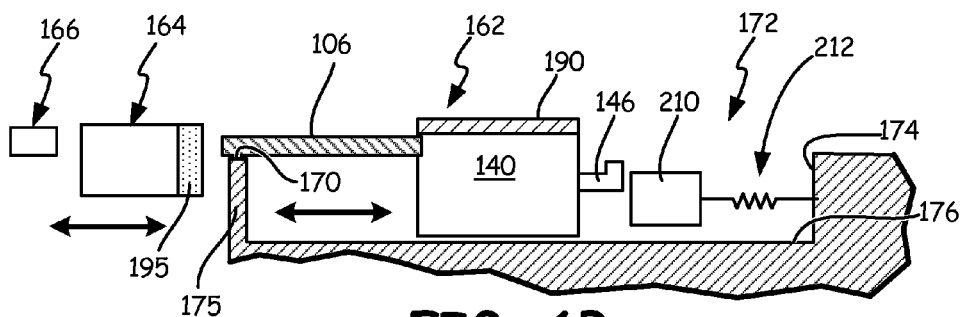
Figure 6C:
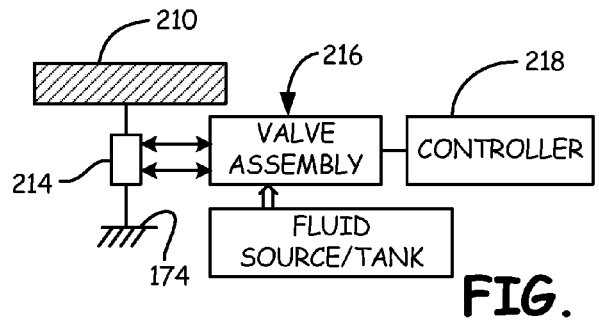
FIG. 6C schematically illustrates another embodiment of a contact block and actuator device for limiting movement or displacement of the bending fingers on the carrier.

FIGS. 6A-6C illustrate another embodiment of a grinding/cutting apparatus 160 that includes carrier nest 172 formed in the workpiece stage 168. In the illustrated embodiment, the lower surface 176 of the nest 172 is recessed below the upper surface 170 and back end wall 174. As shown, the apparatus 160 includes an elongate rigid contact block 210 that abuts the fingers 146 of the carrier/bar unit 162 in the nest 172 to limit displacement or extension of the fingers 146. In the illustrated embodiment, the contact block 210 has a length that extends along each of the fingers 146 along the back side of the carrier 140 as shown in FIG. 6A. As shown in FIGS. 6A-6B, the block 210 is spring biased against the fingers 146 via one or more springs 212 to provide a reactive force responsive to the grinding/cutting force imparted to the bar 110 to limit extension or displacement of the fingers 146. As illustrated in FIG. 6B, the one or more springs 212 are disposed between the end wall 174 of the carrier nest 172 and the contact block 210.

In another embodiment shown in FIG. 6C, the contact block 210 is biased against the fingers 146 pneumatically through a pneumatic device or cylinder 214 operated through a valve assembly 216 through a controller 218. The controller 218 is configured to operate the valve assembly 216 to control fluid flow to increase or decrease pressure against the fingers 146. Alternatively, the contact block 210 can be biased against fingers 146 via an electric actuation device such as a voice coil or piezoelectric actuator (not shown) and application is not limited to the particular actuation device shown.

Figure 7A:
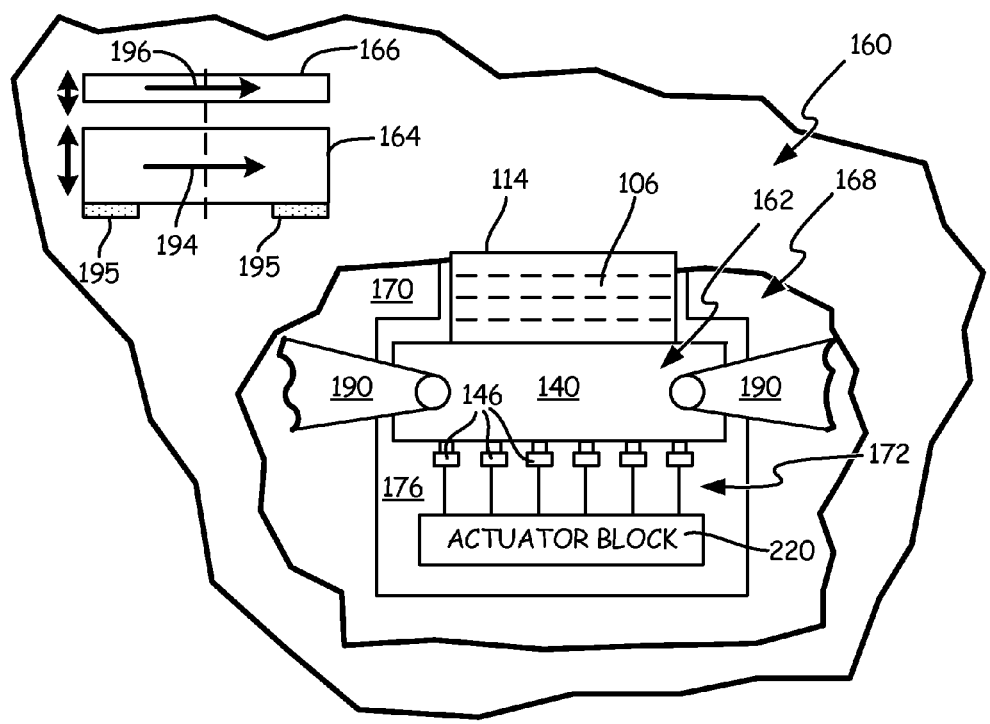
FIGS. 7A-7B schematically illustrate an embodiment of a grinding/cutting apparatus including a carrier nest and actuator block including multiple actuation elements connectable to the bending fingers on the carrier.
Figure 7B:
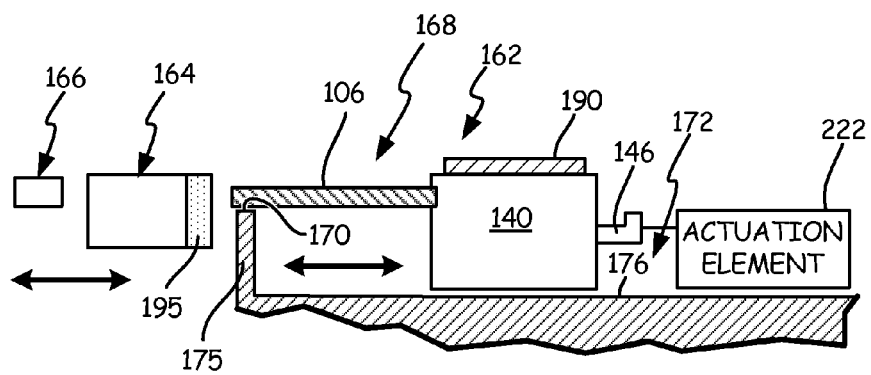

FIGS. 7A-7B illustrate another embodiment of a grinding/cutting apparatus 160 for grinding and cutting a bar 110/stack 106 attached to a lapping carrier 140 as previously described. The apparatus includes stage 168 including the carrier nest 172 as previously described. In the embodiment shown, the apparatus 160 includes an actuator block 220. The actuator block 220 includes a plurality of actuation elements 212 (one shown in FIG. 4B) in nest 172 along the backside of the carrier 140 adjacent to the fingers 146. Each of the fingers 146 is coupled to a separate actuation element 222 to individually control the displacement or force supplied to each finger 146 through the actuation element 222. Illustratively, the separate actuation elements 222 are pneumatic or electrical actuation elements 222, such as a piezoelectric actuator element or voice coil actuator element. For operation, the carrier/bar or carrier/stack unit 162 is clamped on stage 168 so that the carrier 140 is seated in nest 172. During grinding and cutting processes, the actuation elements 222 are separately energized to control or restrict displacement of the fingers 146 in response to the grinding force imparted to the fingers 146 through carrier 140 and bar 110.

Figure 8:
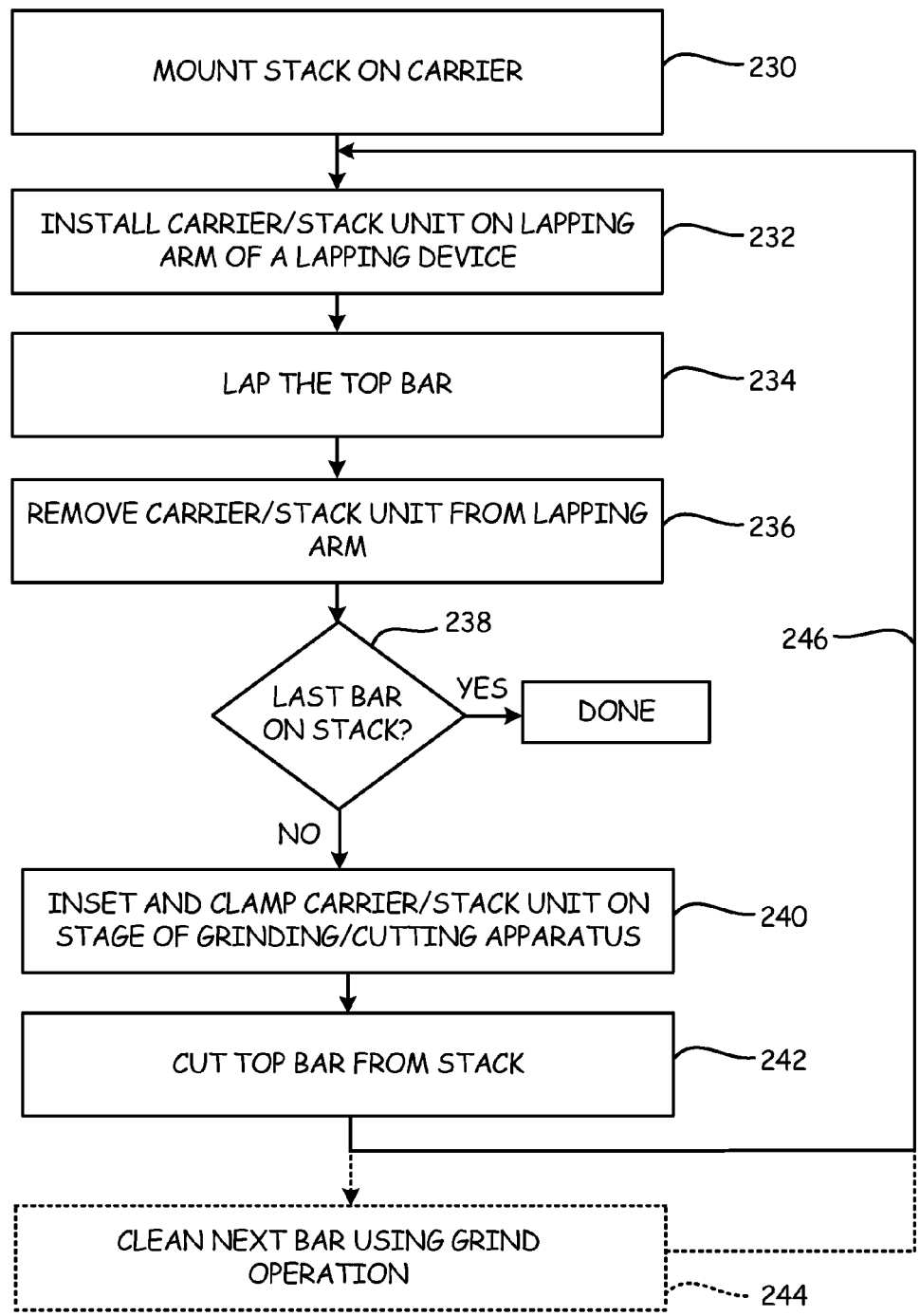
FIG. 8 illustrates process steps for lapping, cutting and grinding bars from a bar stack or chunk.

FIG. 8 illustrates process steps for lapping, cutting and grinding bars from a bar stack or chunk. As shown in step 230, a stack of bars is mounted on a carrier such as 140 to provide the carrier/stack unit 162. In step 232, the carrier/stack unit 162 is installed on the lapping arm 142 of a lapping device. The lapping arm 142 supports the bar 110 relative to the lapping surface 144 to lap the top bar as set forth in step 234. Following the lapping process, the carrier/stack unit 162 is removed from the lapping arm in step 236. If there are additional bars in the carrier/stack unit 162 (step 238), the carrier/stack unit 162 is placed on the stage 168 and inset in the carrier nest 172 of the grinding/cutting apparatus 160 in step 240, and in step 242 the top bar 110 is cut from the stack 106. In step 244, the next bar (top bar exposed on the stack after the cutting step 242) is cleaned using a grind operation. This step is optional in some embodiments. The process steps 232, 234, 236, 238, 240, 242 and 244 are repeated until the last bar in the stack is lapped, cut and ground as illustrated by line 246. Installing the carrier/stack unit 162 on the lapping arm 142 in step 232 may include bonding wires to the lapping guides 150 to provide feedback to control the lapping parameters as described. Following the lapping step 234, the wires may be stripped from the bar 110/stack 106 for grinding and cutting.

In the embodiments illustrated in FIGS. 5A-5C, 6A-6C, and 7A-7B, the apparatus 160 includes a grinding wheel 164 and blade 166 for both grinding and cutting functions. However, the grinding wheel 164 and blade 166 can be incorporated into separate devices having a stage including a carrier nest with finger displacement control components as described and application is not limited to a single device having both the grinding wheel 164 and blade 166 as shown.

In the embodiments described above in connection with FIGS. 4A-4B, 5A-5C, 6A-6C, 7A-7B and 8, the entire carrier 140 is attached to grinding/cutting machine 160 while the bar 110 or the stack 106 is being cut. The embodiments described below in connection with FIGS. 9A-9E instead include a modular carrier having a detachable modular extender, which is releasably coupled to the remaining portion of the carrier. The bar 110 or the stack 106 is attached to the modular extender. The modular extender with the attached bar 110 or stack 106 is detached from the remaining portion of the carrier and attached to the grinding/cutting machine while the bar 110 or the stack 106 is being cut.

Figure 9A:
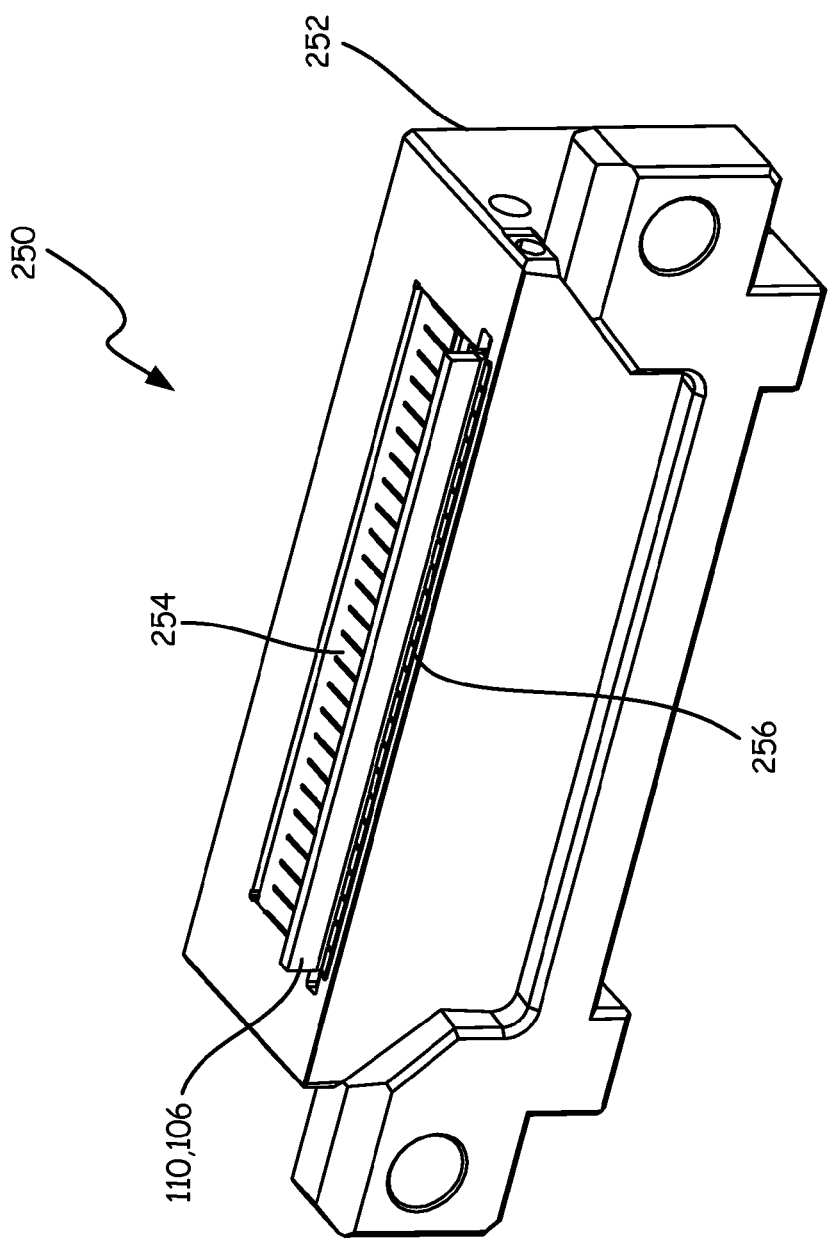
FIGS. 9A-9E diagrammatically illustrate an embodiment of a modular carrier.

FIGS. 9A-9E illustrate a modular carrier 250 for a slider bar 110/stack 106. As shown in FIG. 9A, primary components of modular carrier 250 include a frame 252, an insert 254 and a modular extender 256. Bar 110 or stack 106 is attached to modular extender 256. Modular extender 256 is releasably coupled to insert 254 using at least one of screws, one or more springs, one or more cams or one or more levers. Details of individual components 252, 254 and 256 are provided below in connection with FIG. 9B-9E.

Figure 9B:
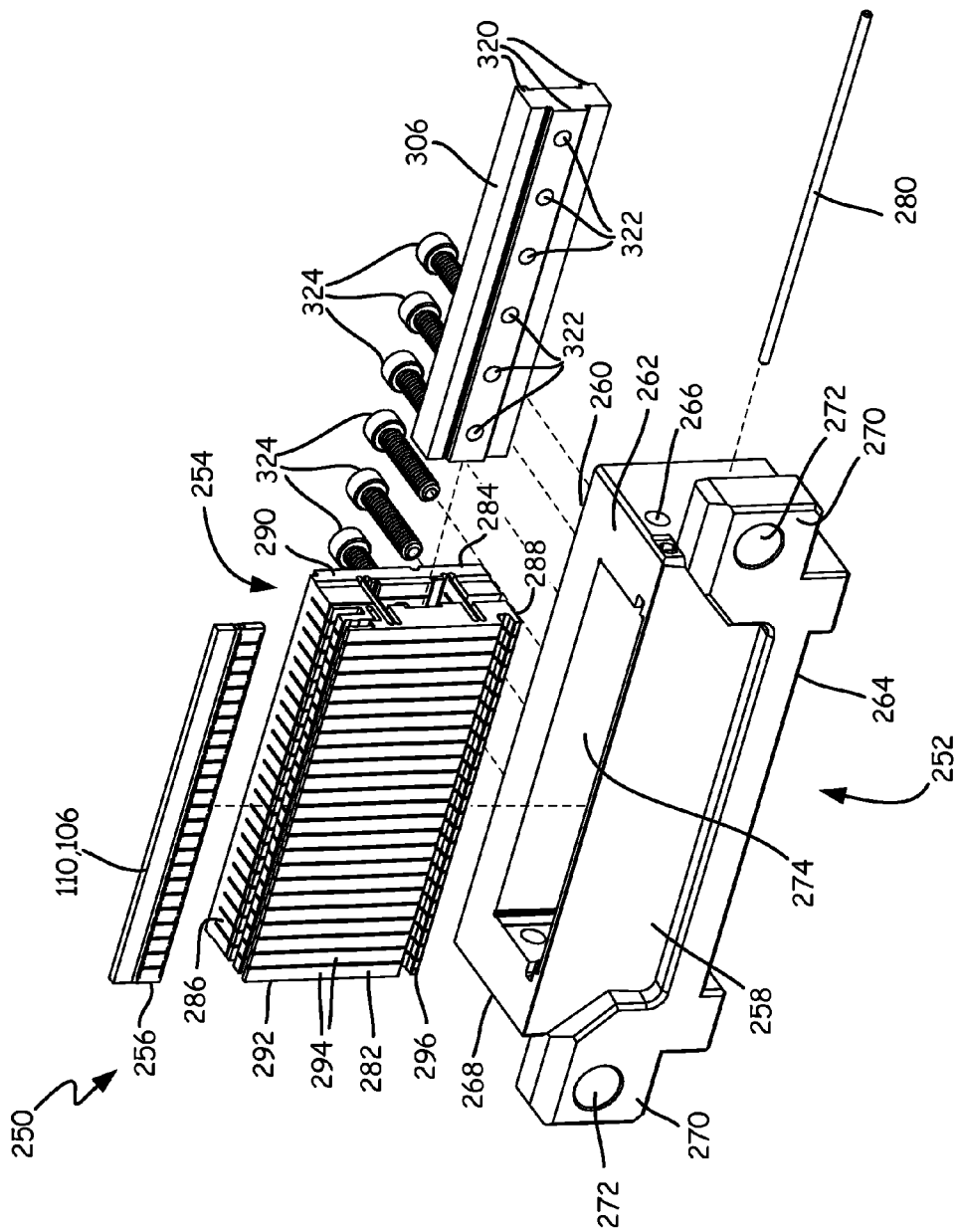
Figure 9C:
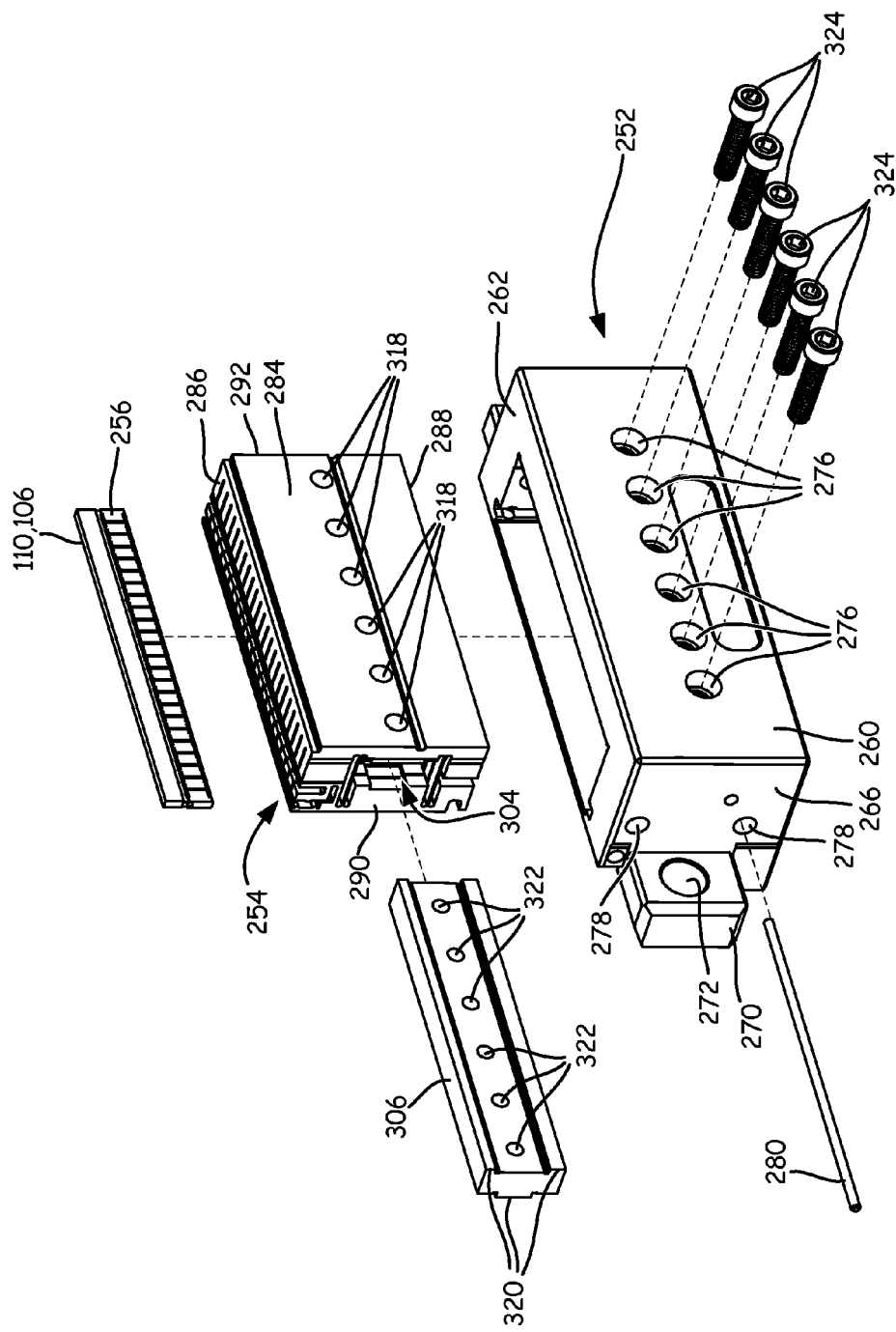

FIGS. 9B and 9C show a rear exploded view and a front exploded view, respectively, of modular carrier 250. In modular carrier 250, frame 252 has a rear 258, a front 260, a top 262, a bottom 264, a first side 266 and a second side 268. Rear 258 of frame 252 includes attachment extensions 270, which may be two in number, for example. In illustrated embodiments, attachment extensions 270 include fastener openings 272 to connect the modular carrier 250 to one or more processing machines. For example, modular carrier 250 may be connected to lapping arm 142 of FIG. 4A with the help of attachment extensions 270 with fastener openings 272. Frame 252 also includes a cavity or hole 274 that extends from the top 262 to the bottom 264. The cavity or hole 274 is sized to receive insert 254, which is described below. The front 260 of frame 262 includes a plurality of fastener holes 276 that open into cavity or hole 264. First side 266 and second side 268 also include holes 278 for receiving one or more pins such as 280.

Like frame 252, insert 254 has a rear 282, a front 284, a top 286, a bottom 288, a first side 290 and a second side 292. Rear 282 of insert 252 includes a plurality of bending strips 294 that extend from the top 286 to the bottom 288. Bending tips at substantially the bottom 288 include generally "u" shaped bending fingers 296. The bending fingers 296 form bi-directional bending contacts or surfaces 298, 300 to input longitudinal push or pull forces to the bending strips 294 as illustrated by arrows 302. One or more bending actuators (not shown in FIGS. 9A-9D) are coupled to the bending fingers 296 to input the push/pull force to the bending strips 294 through the bending fingers 296 during a lapping process. Any suitable type of bending actuators may be used. For example, the bending actuators may be bi-directional actuators (e.g. pneumatic actuators) to input the push/pull force to control twist, crown and camber dimensions of the bar 110 or stack 106 during lapping. Feedback to control during the lapping process may be carried out as described above in connection with FIGS. 4A and 4B.

Figure 9E:
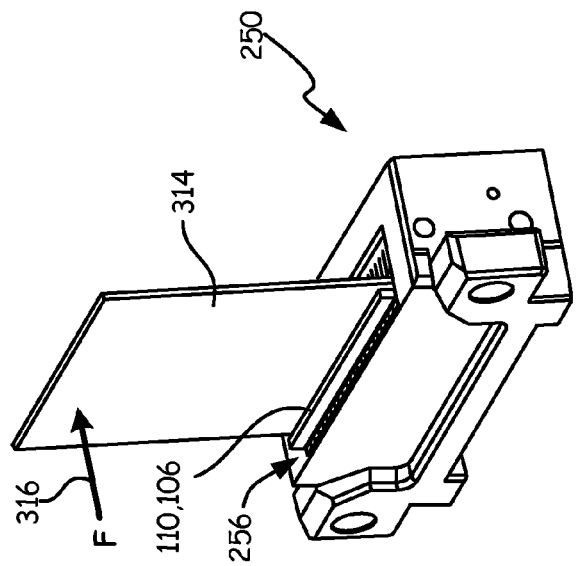
Figure 9D:
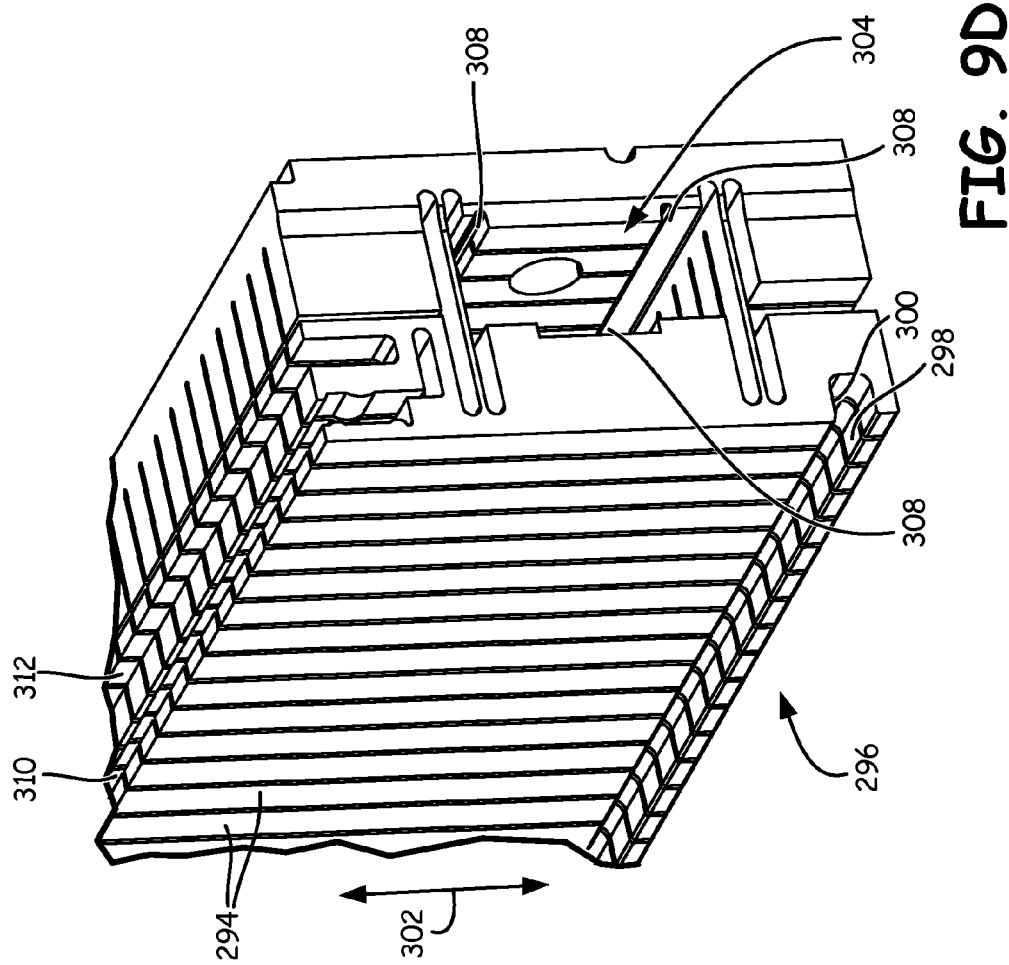

As can be seen in FIGS. 9C and 9D, insert 254 includes a lengthwise hole 304 that extends from first side 290 to second side 292 of insert 254. Hole 304 is sized to receive a clamp 306 and includes features such as channels 308 that are configured to help hold clamp 306 in place within insert 254. A top 286 of insert 254 includes a first slot 310 that is configured to receive and hold modular extender 256 in a position in which forces may be suitably applied to bar 110 or stack 106 via bending strips 294. A second slot 312 is included at the top 286 of insert 254 and proximate the first slot 310. As shown in FIG. 9E, a plate or other device 314 may be inserted into second slot 312, and a force 316 may be applied to the plate 314 in a direction shown in FIG. 9E to enable extraction/removal of the modular extender 256 with the attached bar 110/slider 106 from first slot 310.

As can be seen in FIG. 9C, front 284 of insert 254 includes a plurality of fastener holes 318, which are positioned to be aligned with fastener holes 276 in frame 252. In an illustrative embodiment, insert 254 of the modular carrier is formed of a titanium-aluminum-vanadium Ti—Al—V alloy material to provide sufficient displacement to input bending to the one or more slider bars 106 supported on the modular extender 256 while providing sufficient stiffness to compensate for input load and stress during the lapping. An illustrative titanium-aluminum-vanadium alloy material is Ti-6Al-4V. In some embodiments, insert 254 may be formed of stainless steel. In some embodiments, a similar material is used to form both insert 254 and modular extender 256. For example, Ti-6Al-4V or stainless steel may be used for both elements 254 and 256. In some embodiments, insert 254 may be formed of a different material than the material used to form modular extender 256. For example, if Ti-6Al-4V is used for one element 254 or 256, then stainless steel may be used for the other element. Although particular materials are disclosed, the application is not limited to the particular materials disclosed and other materials that provide sufficient displacement and stiffness for such an assembly can be used.

As noted above, lengthwise hole 304 in insert 254 is sized to receive clamp 306 and includes features such as channels 308 that are configured to help hold clamp 306 in place within insert 254. Clamp 306 includes projections 320 that are shaped and sized to fit/slide into corresponding channels 308 in insert 254. Clamp 306 also includes fastener holes 322 that are positioned to be aligned with fastener holes 318 in insert 254 and to be aligned with fastener holes 276 in frame 252.

Modular carrier 250 is assembled together by first inserting clamp 306 into hole 304 in insert 254 such that fastener holes 322 in clamp 306 are aligned with fastener holes 318 in insert 254. Then, insert 254, with clamp 306 suitably located therein, is positioned within cavity or hole 274 in frame 252 such that fastener holes 318 in insert 254 are aligned with fastener holes 276 in frame 252. Pin 280 may then be inserted into hole 278. Fasteners (for example, screws) 324 may then be inserted into aligned holes 276, 318 and 322 and tightened to properly hold insert 254 within frame 252. As noted above, modular extender 256 is releasably coupled to insert 254.

As noted earlier, modular carrier 250 may be connected to lapping arm 142 of FIG. 4A, for example, with the help of attachment extensions 270 by inserting suitable fasteners into fastener openings 272 in attachment extensions 270 and into corresponding fastener openings (not shown) in lapping arm 142. A lapping step on bar 110/stack 106 connected to modular extender 256 may then be carried out when modular extender 256 is within first slot 310 in frame 254. Upon completion of the lapping step, modular extender 256 may be released from slot 310 by inserting a suitable device (for example, plate 314) into second slot 312 and applying a force as described above. The released modular extender 256 with the attached bar 110/stack 106 may then be clamped to a stage for grinding/cutting of bar 110/stack 106.

FIG. 10 is a diagrammatic illustration of a stage 326 for grinding/cutting bar 110/stack 106. As shown, a clamping mechanism 328 is included to clamp modular extender 256 to stage 326. Unlike stage 162 (shown in FIGS. 5A, 5B, 6A, 6B, 7A and 7B), stage 326 includes no nest with protection features for different carrier components. Stage 326 simply includes a substantially flat upper surface 330 to which mechanism 328 clamps the modular extender 256. A grinding/cutting step on bar 110/stack 106 is carried out using grinding/cutting tools 164, 166 in a manner similar to that described above in connection with FIGS. 5A-5C, 6A-6C and 7A-7B. After the grinding/cutting step is complete, if any remaining bar 110/stack 106 is still attached to modular extender 256, that modular extender 256 is simply unclamped from stage 326 and reinserted into first slot 310 in the remaining portion of modular carrier 250 attached to lapping arm 142 for a next lapping step to be carried out.

Figure 11:
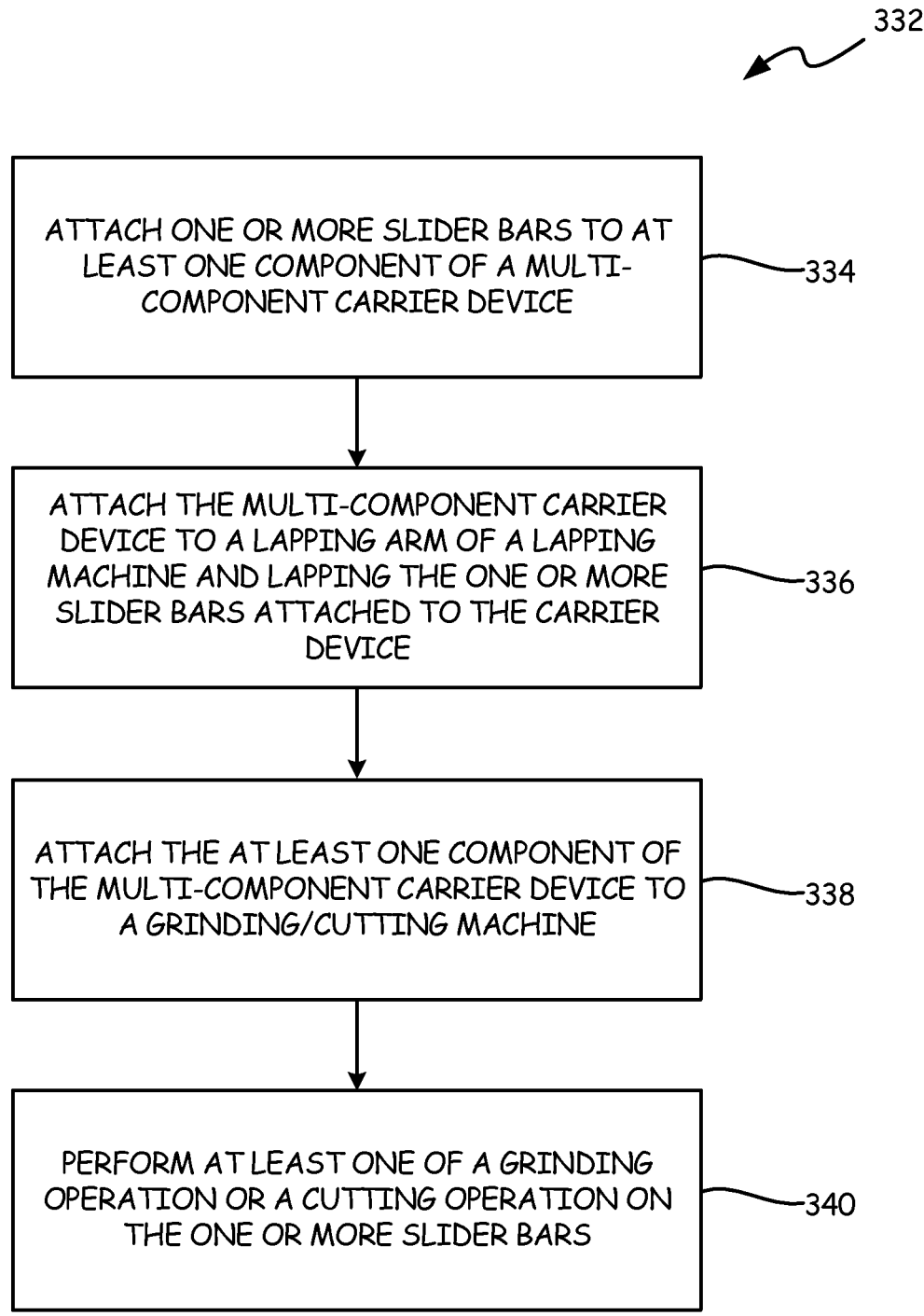
FIG. 11 is a simplified flow diagram of a method embodiment.

FIG. 11 is a flow diagram 332 of a general method embodiment. At step 334, one or more slider bars are attached to at least one component of a multi-component carrier device. At step 336, the multi-component carrier device is attached to a lapping arm of a lapping machine and the one or more slider bars attached to the carrier device are lapped. At step 338, the at least one component of the multi-component carrier device is attached to a grinding/cutting machine. At step 340, at least one of a grinding operation or a cutting operation is performed on the one or more slider bars.

It is to be understood that even though numerous characteristics and advantages of various embodiments of the disclosure have been set forth in the foregoing description, together with details of the structure and function of various embodiments of the disclosure, this disclosure is illustrative only, and changes may be made in detail, especially in matters of structure and arrangement of parts within the principles of the present disclosure to the full extent indicated by the broad general meaning of the terms in which the appended claims are expressed. For example, the particular elements may vary depending on the particular application, while maintaining substantially the same functionality without departing from the scope and spirit of the present disclosure. In addition, although preferred embodiments described herein are directed to a bar stack workpiece, it will be appreciated by those skilled in the art that the teachings of the present disclosure can be applied to different workpieces, without departing from the scope and spirit of the present disclosure.

What is claimed is:

1. A method comprising:
   attaching a bar stack comprising individual bars stacked one above the other to a modular extender of a multi-component carrier device, wherein the bar stack includes a top that defines a top bar and an opposing bottom and wherein the modular extender includes a first end and an opposing second end, the second end of the modular extender being attached in its entirety to an entirety of the bottom of the bar stack;
   inserting and releasably coupling the entirety of the first end of the modular extender into a recessed elongated slot in a receiving component of the multi-component carrier device so that the first end is located within the multi-component carrier device and the second end that is attached to the bottom of the bar stack protrudes from the multi-component carrier device;
   attaching the multi-component carrier device to a lapping arm of a lapping machine and while lapping the top bar of the individual bars of the bar stack that is releasably coupled to the multi-component carrier device by the modular extender, the modular extender remains untouched by the lapping machine;
   removing the modular extender from the elongated slot in the receiving component of the multi-component carrier device by releasing the modular extender from the elongated slot in the receiving component of the multi-component carrier device;
   clamping the released modular extender to a cutting machine; and
   performing, by the cutting machine, a cutting operation on the bar stack to separate at least one of the individual bars from the bar stack, wherein the modular extender remains untouched by the cutting machine;
   wherein a top surface of the top bar is exposed during the lapping of the top bar and during the cutting operation.

2. The method of claim 1, and wherein inserting the entirety of the first end of the modular extender into the recessed elongated slot in the receiving component of the multi-component carrier device comprises inserting the portion of the modular extender into a first U-shaped and recessed elongated slot in the receiving component of the multi-component carrier device.

3. The method of claim 2, wherein detaching the modular extender from the receiving component comprises inserting a detachment-assistance plate into a second U-shaped and recessed elongated slot in the receiving component that is proximate to and substantially parallel to the first U-shaped slot and applying a detachment-enabling force to the detachment-assistance plate to extract the modular extender with the attached bar stack from the first U-shaped slot.

4. The method of claim 1, wherein performing the cutting operation on the bar stack comprises cutting the top bar from the bar stack attached to the modular extender, thereby separating the top bar from a remaining portion of the bar stack.

5. The method of claim 4, further comprising:
   unclamping the modular extender from the cutting machine; and
   re-inserting the portion of the modular extender into the recessed elongated slot in the receiving component of the multi-component carrier device to perform a lapping operation on a top bar of the remaining bar stack.

6. A carrier device comprising:
   a multi-component structure comprising:
      a modular extender having a first end and a second end, wherein an entirety of the second end of the modular extender is attachable to an entirety of a bottom of a bar stack comprising individual bars stacked one above the other; and
      a receiving component comprising:
         an insert having a recessed elongated slot configured to receive and releasably couple an entirety of the first end of the modular extender so that the first end of the modular extender is located within the insert and the second end that is attachable to the bottom of the bar stack protrudes from the insert; and a frame having a cavity sized to receive the insert that includes the elongated slot, wherein the frame further comprises attachment extensions outside the cavity, and wherein the attachment extensions are configured to enable securing of the frame to a lapping machine;

wherein, when the first end of the modular extender is within the elongated slot in the insert and when the insert is in the cavity in the frame, the multi-component structure is configured to be secured to a lapping machine so that when a top of the bar stack is being lapped by the lapping machine, the modular extender remains untouched by the lapping machine, and wherein, when the insert is in the cavity in the frame, portions of the insert that include the elongated slot are in the cavity such that walls of the cavity surround the portions of the insert that include the elongated slot.

7. The carrier device of claim 6, wherein the elongated slot in the insert is a first U-shaped elongated slot.

8. The carrier device of claim 7, wherein the insert further comprises a second U-shaped elongated slot proximate to the first U-shaped elongated slot, and wherein the second U-shaped elongated slot is a detachment-assistance slot.

9. The carrier device of claim 8, wherein the detachment-assistance slot is configured to receive a detachment-assistance lever.

10. The carrier device of claim 6, wherein the first end of the modular extender is configured to be released from the elongated slot in the insert.

11. The carrier device of claim 6, wherein a width of the modular extender is substantially equal to a width of a slider bar of the bar stack.

12. An assembly comprising:

a multi-component carrier device configured to secure a bar stack comprising individual bars stacked one above the other to a lapping machine when a top surface of a top bar of the bar stack is being lapped by the lapping machine, wherein the multi-component carrier device comprises a plurality of bending fingers; and a cutting machine configured to perform a cutting operation on the bar stack to separate at least one of the individual bars from the bar stack, the cutting machine comprising:

a stage that comprises an upper surface and a carrier nest recessed below the upper surface with the upper surface of the stage being disposed around an opening into the nest, wherein the carrier nest includes at least one protection feature configured to limit a displacement of the bending fingers; and a clamping mechanism configured to clamp at least one component of the multi-component carrier device to the stage to enable the cutting machine to carry out the cutting operation on the bar stack with the top surface of the top bar exposed.

* * * * *